April 9, 1935.   R. L. MULLER   1,997,073
CHECK WRITING MACHINE
Filed March 19, 1932   9 Sheets-Sheet 1

INVENTOR
Robert L. Muller
BY
Rector, Hibben, Davis & Macauley
ATTORNEYS

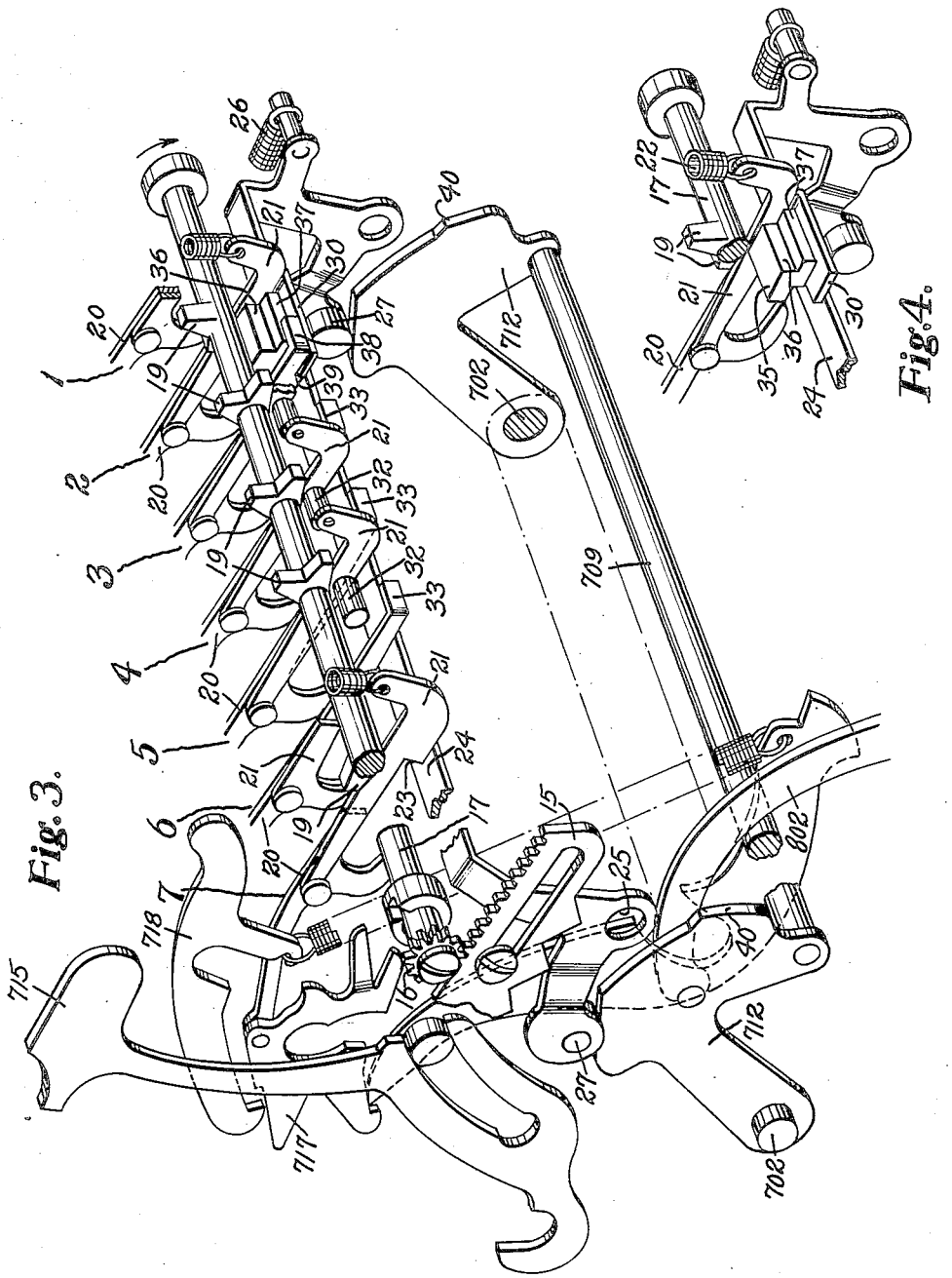

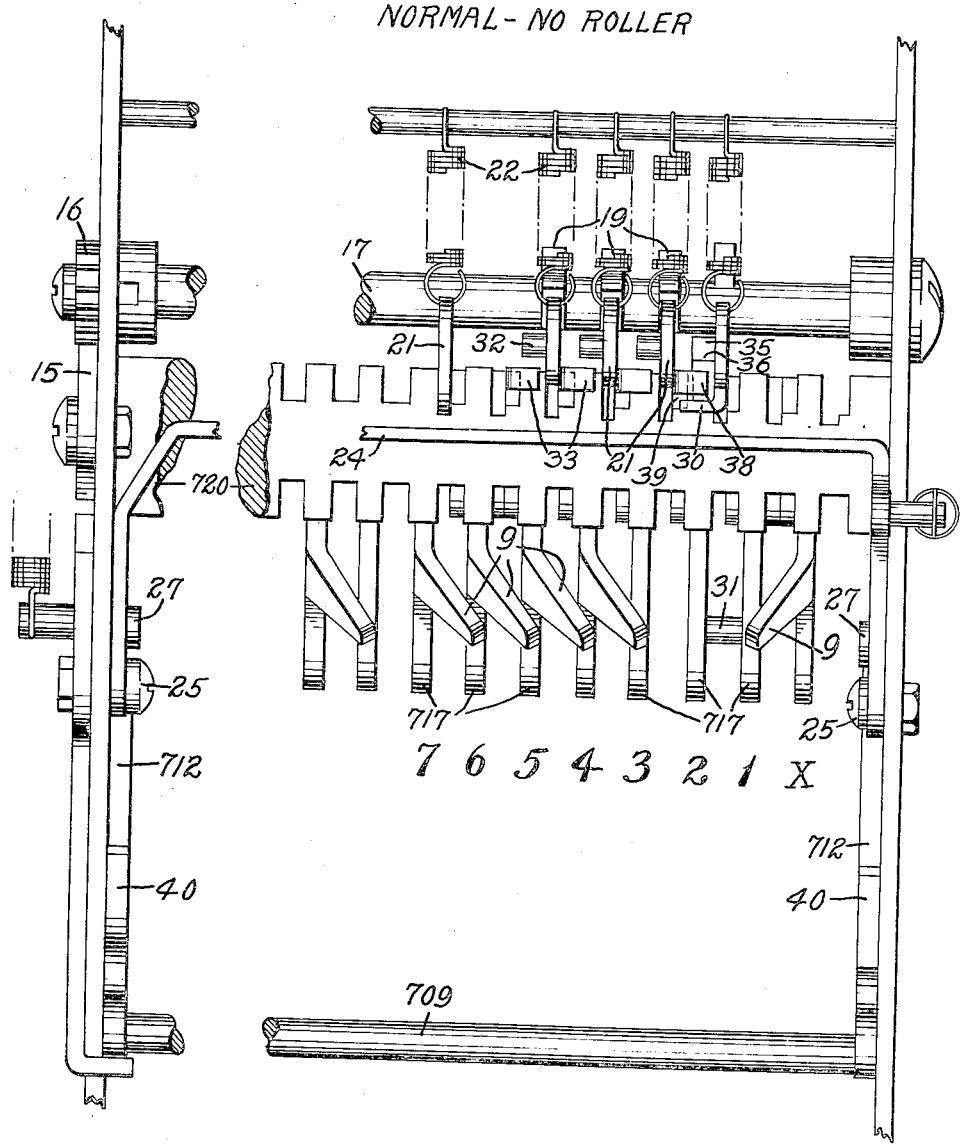

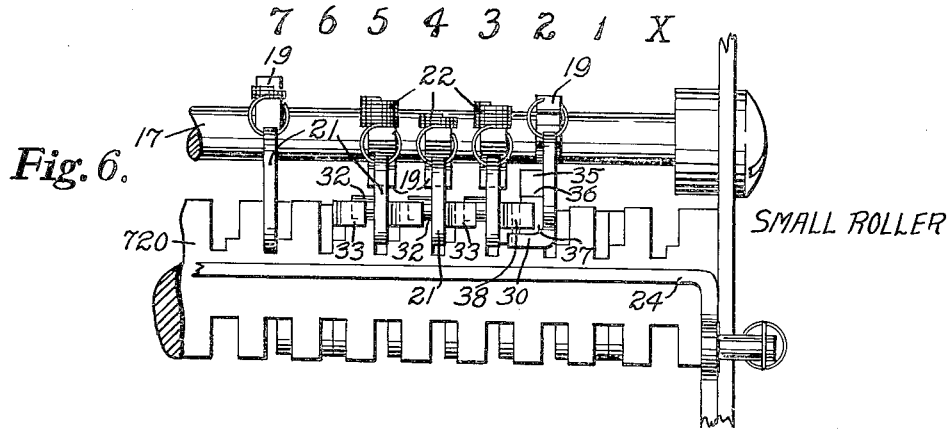
Fig. 6. SMALL ROLLER
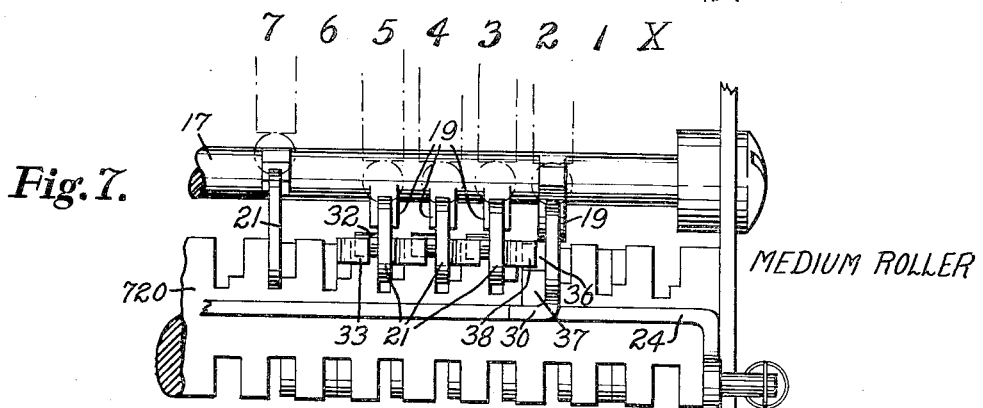
Fig. 7. MEDIUM ROLLER
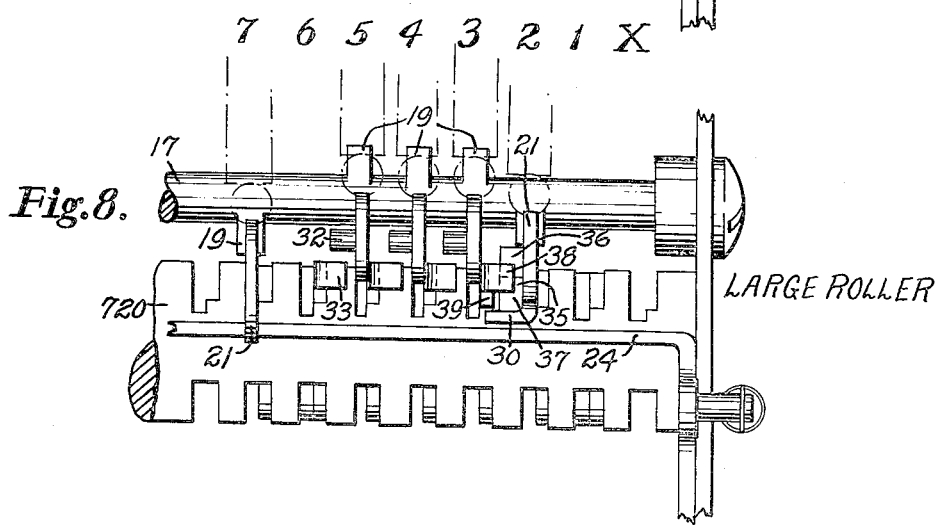
Fig. 8. LARGE ROLLER

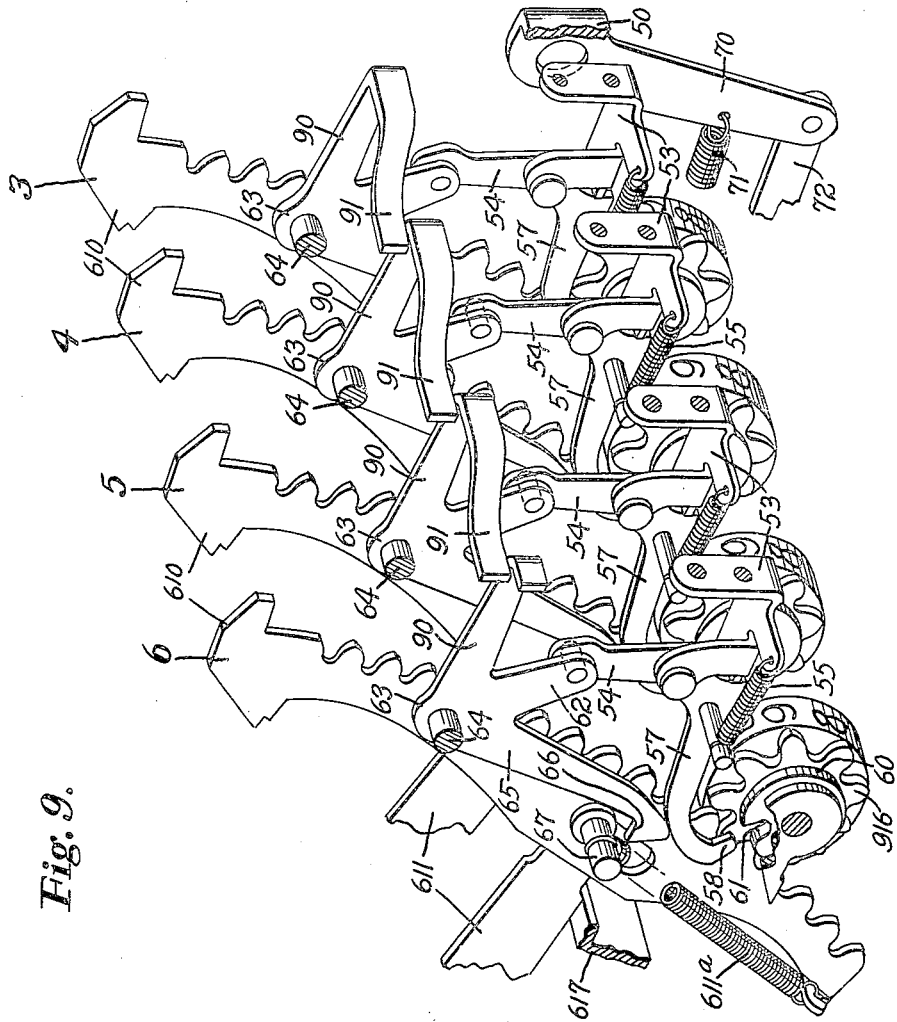

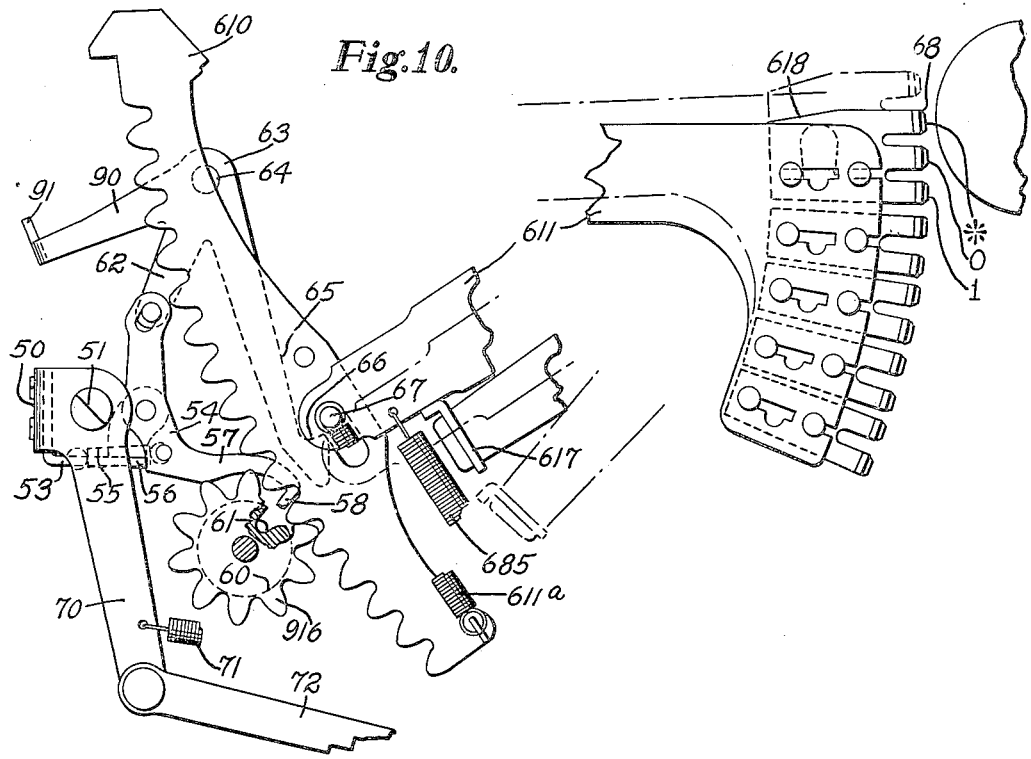
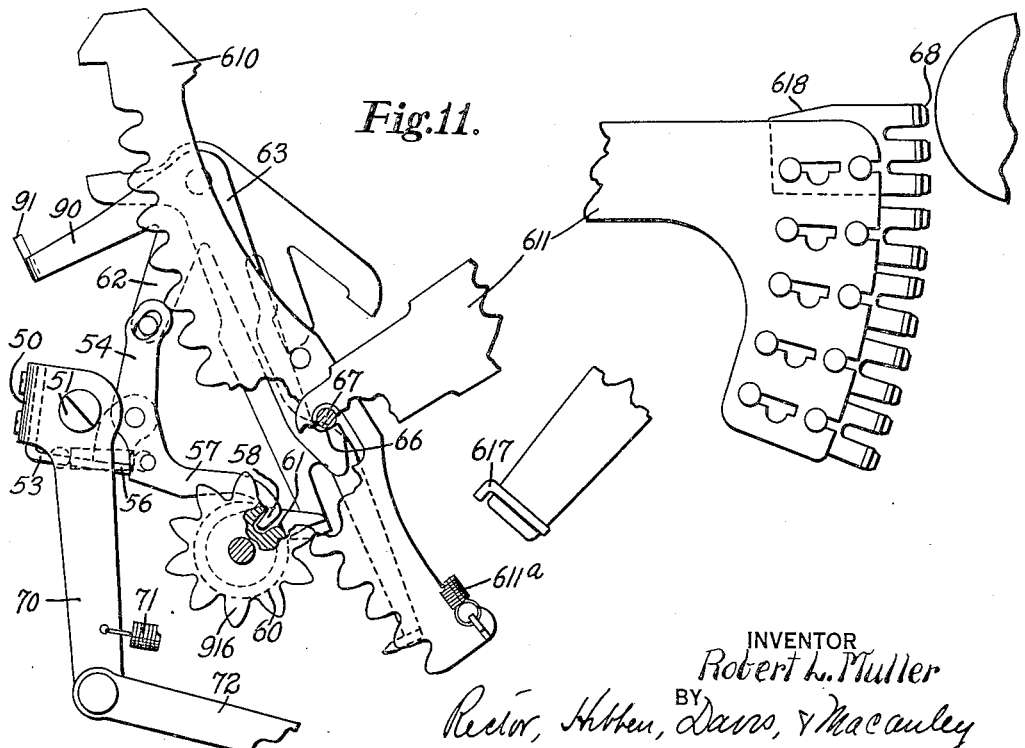

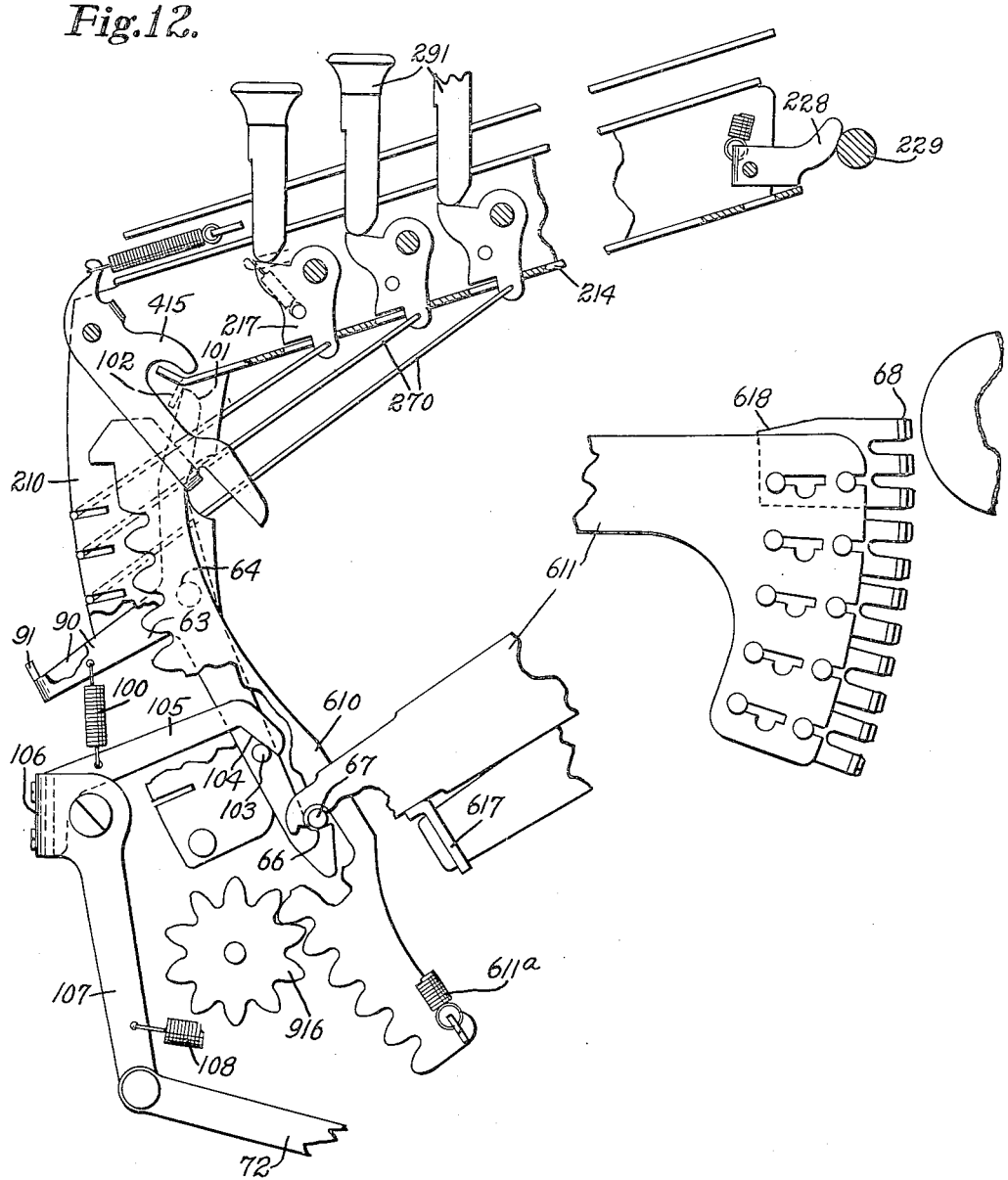

April 9, 1935.                R. L. MULLER                   1,997,073
                           CHECK WRITING MACHINE
                           Filed March 19, 1932         9 Sheets-Sheet 9

| Check Number | LEDGER Pick-up | Additions | Net Totals |
|---|---|---|---|
| 1001 | .50 | .20 | ****.70 |
| 1002 | 5.00 | .25 | ***5.25 |
| 1003 | 50.00 | .25 | **50.25 |

Check No 1001: ANY CHECK — EXACTLY ** DOLLARS AND .70 CENTS. **.70
Check No 1002: ANY CHECK — EXACTLY *5 DOLLARS AND .25 CENTS. *5.25
Check No 1003: ANY CHECK — EXACTLY 50 DOLLARS AND .25 CENTS. 50.25

Fig. 13.

INVENTOR
Robert L. Muller
BY
Rector, Hibben, Davis, & Macauley
ATTORNEYS

Patented Apr. 9, 1935

1,997,073

UNITED STATES PATENT OFFICE 1,997,073

CHECK WRITING MACHINE

Robert L. Muller, Detroit, Mich., assignor to Burroughs Adding Machine Company, Detroit, Mich., a corporation of Michigan Application March 19, 1932, Serial No. 599,873

26 Claims. (Cl. 235—58)

This invention relates to a check writing machine and it is particularly concerned with the feature of printing characters to the left of the amount of a check without interfering with the printing of ciphers to the right when such ciphers should appear in the orders in which characters are sometimes printed.

The machine disclosed is not only capable of writing a check for an amount entered on the keys of the machine, but it is also capable of performing certain calculating operations, such as addition and subtraction and the making of a record thereof, and then automatically writing a check for the net amount of the calculations. The machine can also be used for calculating and bookkeeping operations of a general nature in which event certain of the check writing features are preferably disabled.

The general object of the invention is to provide an improved check writing machine.

A more particular object is to provide, in a check writing machine, an improved mechanism for printing characters to the left of the amount of the check without interfering with the printing of ciphers to the right.

Other and more particular objects will appear from the following specification and drawings.

An embodiment of the invention is shown in the accompanying drawings in which:

Fig. 3 is a perspective view of a portion of the printing mechanism, the parts being spread to show the invention more clearly and being in normal condition.

Fig. 4 is a partial perspective of a portion of the printing mechanism illustrated in Fig. 3 with the parts enlarged slightly to show them more clearly.

Fig. 5 is a front elevation of a portion of the printing mechanism showing the parts in the position they occupy during their normal condition as related to the manner in which they are controlled by the carriage.

Fig. 6 is a partial front elevation similar to Fig. 5 showing the parts in the position they occupy when conditioned by a "small" roll on the paper carriage.

Fig. 7 is a partial front elevation similar to Fig. 6 showing the parts in the position they occupy when conditioned by a "medium" roll on the carriage.

Fig. 8 is a partial front elevation similar to Fig. 6 showing the parts in the position they occupy when conditioned by a "large" roll on the carriage.

Fig. 9 is a perspective view of certain of the mechanism associated with the actuators and the registers at the front of the machine.

Fig. 10 is a partial right side elevation showing how the invention is associated with the printing mechanism, the actuators and the register, the parts being shown in normal position.

Fig. 11 is a view similar to Fig. 10 showing the position of the parts during an operation of the machine with the mechanism set to cause the characters to be printed in certain orders of the machine.

Fig. 12 is a partial right side elevation of a species of the invention in which the control is through the amount keys instead of through the paper carriage.

Fig. 13 shows several samples of work that may be performed on the machine.

The machine embodies, in its general construction, many of the parts of the Burroughs calculating machine and, since these are well known in the art and described in numerous prior patents, they will be mentioned only briefly.

General construction

Figure 1:
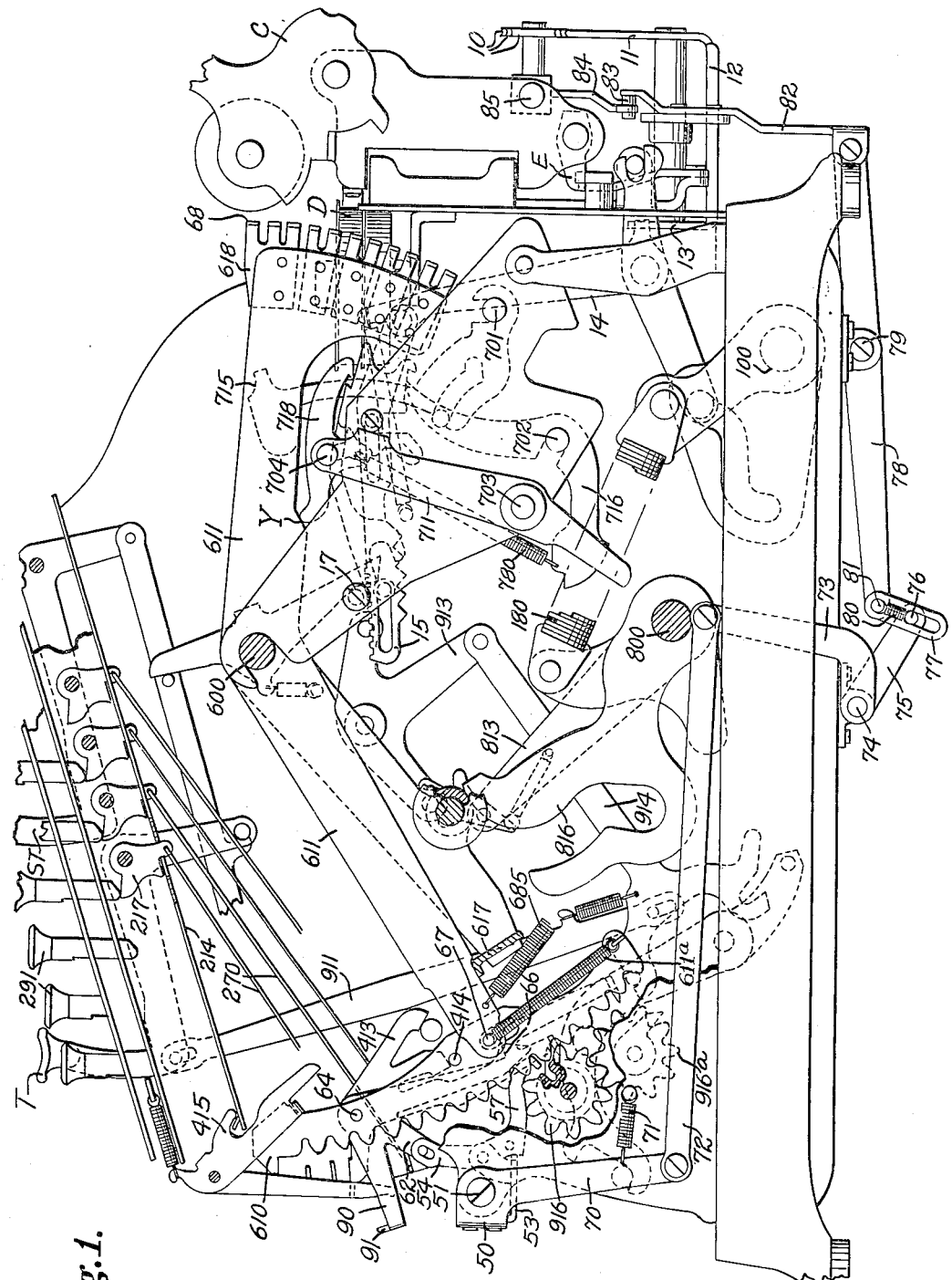
Fig. 1 is a right side elevation of the machine with the parts in normal condition, certain of the parts having been omitted to show others more clearly.

Referring to Fig. 1, the machine is provided with a plurality of banks of depressible amount keys 291, the number of banks being varied to suit the requirements. Items are entered by depressing these keys and, as each key is depressed, its stem rocks a small bell crank lever 217 which pulls a stop wire 270 into position to arrest the downward movement of its actuator rack 610, there being a plurality of these actuator racks of different orders corresponding to the banks of amount keys. When a key 291 is depressed its bell crank lever 217 moves the key locking slide 214 rearward where it is latched by a detent 228 (Fig. 12) until released by the restoring bail 229 near the end of a machine operation. Rearward movement of key locking plate 214 for a given bank rocks the latch 415 for that bank counterclockwise to release the actuator 610 for said bank. The actuators do not move downward until further released by movement of the releasing bail 617 which extends across the machine under arms 611 connected to the actuators.

During the forward stroke of the machine the bail 617 is rocked counterclockwise from the position of Fig. 1 and, during the return stroke, it is returned clockwise to the position shown in said figure. This movement of the bail is under the control of a cam 816 fixed to a shaft 800 that has a crank fastened to it which is connected through springs 160 to a crank on the main drive shaft 100.

Suitable registering mechanism is provided in the form of two sets of pinions 916 and 916a forming a "tumbling" register that may be used for addition and subtraction. This registering mechanism is rocked into and out of engagement with the actuators by a pitman 914 and arm 813 in a manner that is well known in the art and which need not be described here. Likewise, the control of the "tumbling" register for addition or subtraction is well known and an understanding of it is not necessary for an understanding of the present invention. Suitable totaling and sub-totaling mechanism is provided under the control of the total key T and the subtotal key ST respectively, these keys serving to operate link 911 to control pitman 914.

The machine has a traveling paper carriage C which moves across the machine in one direction under the influence of a spring drum D and which is automatically returned by a motor in the manner described in Rinsche Patent No. 1,580,534. The carriage is provided with a tabulating mechanism E by means of which it may be tabulated from column to column so as to occupy different columnar positions which are under the control of the operator or the paper carriage, as may be desired.

The machine also has an automatic repeat mechanism (not shown) such as is fully described in Muller Patent 1,397,774 which causes the machine to automatically go through a series of operations after it has been set into operation in a predetermined columnar position of the carriage.

*Printing mechanism*

The machine is provided with a printing mechanism having a plurality of type carrying members of different orders which are differentially positioned at the same time that the actuators are positioned. The type carrying members are the arms or segments 611 which are connected at their forward ends to their respective actuators by a pin and slot connection that enables the segments to move a limited amount relative to the actuators under certain conditions. The segments 611 carry a plurality of movable types 618 at their rear ends including digit types which range from 0 to 9, inclusive, and, in the present invention a special character type also (Fig. 9).

When the bail 617 is moved downwardly during a forward stroke of the machine under the influence of its cam 816, the type segments 611 move a step relative to their actuators under the influence of springs 611a and the type segments, together with the actuators, then continue their downward movement until arrested in differential positions normally determined for each order by the respective stop wires 270 that have been moved to position by depression of the amount keys. On return movement of the restoring bail 617, the type bars and actuators are moved upward again and restored to their normal position shown in Fig. 1 except that, in the event a transfer occurs in any order, the actuator in said order is given an extra step of movement owing to the fact that the transfer pawl 613 is rocked so that it will not limit the upward movement of the actuator rack through engagement with the stud 414 on said rack.

Figure 2:
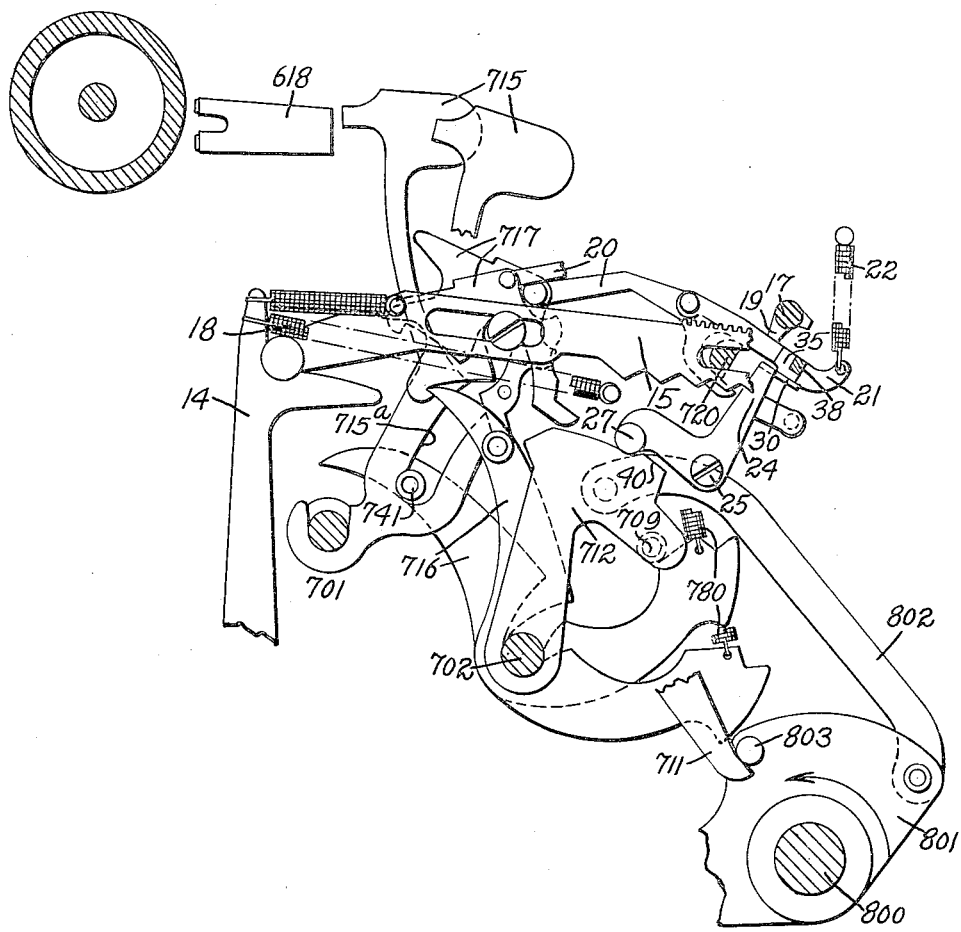
Fig. 2 is a partial left side elevation and section of the printing mechanism showing the position of the parts during the forward stroke of the machine and before the firing of the printing hammers in the dollars section.

The hammer operating means for the printing mechanism is of the general type illustrated in Burroughs Patent No. 505,078, with improvements described in Putnam 1,018,371. Briefly, this is as follows:

After a type segment is positioned, the printing mechanism is operated to fire the hammers 715 which strike the types 618 that are in printing position. The firing hammers 715 are pivoted at 701 (Fig. 2) and each is fired by its respective firing member 716 pivoted on the shaft 702 and urged counterclockwise by a spring 700. Each firing member is normally held against movement by a trigger 717 that hooks over the pointed upper end of the firing member 716 as illustrated in Figs. 1 and 2. When the trigger for any bank is released, the firing member 716 for that bank is suddenly snapped counterclockwise as viewed in Fig. 2 by its spring 700 and a stud 704 on the firing member operating in a slot 715a in the corresponding hammer 715 fires the hammer rearwardly toward the platen. The slot 715a in the hammer is enlarged near its inner end so that no camming or forcing action takes place near the end of the movement of the hammer, the momentum of the hammer being depended upon to carry it to printing position. This construction is for the purpose of enabling printing to be eliminated by controlling the movement of the firing members 716. If these firing members are restrained from sudden movement and are allowed to move only gradually, the hammers 715 will not be given any momentum and they will not move to their final printing positions. This action is called "walking out" the firing hammers and is described in detail in Putnam Patent No. 1,018,371.

The triggers 717 are released by their respective pawls 718 (Fig. 3) pivoted on a shaft 704 (Fig. 1) carried by the upper ends of two arms 711 that are pivoted on a shaft 703, one of said arms being illustrated in Fig. 1. The lower end of the arm 711 illustrated in Fig. 1 extends down into the path of a stud 803 (Fig. 2) on the plate 801 that operates with the shaft 800 and the pitman controlling arm 813 (Fig. 1).

Near the end of each forward stroke of the machine, during which stroke the plate 801 moves counterclockwise toward the position of Fig. 2, the stud 803 engages the lower end of the arm 711 to rock it clockwise to thereby carry all the pawls 718 forward to release their triggers 717 by rocking them clockwise, thereby releasing the firing members 716 for sudden action. This release occurs in all orders in which the type segments 611 move to differential positions greater than their "0" positions. In the orders in which the segments 611 do not move farther than their "0" position the tails of the pawls 718 engage shoulders Y (Fig. 1) on the segments 611 before the triggers 717 are released and these shoulders act to cam the pawls 718 clockwise to move their ends out of the path of the shoulders on triggers 717 so that the triggers in these orders are not released as the pawls 718 are moved. This prevents operation of the printing mechanism in all banks in which no amount keys are depressed and, normally, no figures or ciphers are printed to the left of the last order to the left in which an amount key is depressed. However, it is necessary to print ciphers in orders to the right and this is accomplished by providing the triggers 717 with tails 9 (Fig. 5) which overlap to the right so that when the trigger in any order is released it will release all of those to the right of it that are not released by their own pawls. Accordingly, the triggers in orders to the right where "0's" are to be printed will be fired along with the triggers in the other orders where digits are to be printed.

The firing members 716 are restored by a bail 709 (Figs. 2 and 3) carried by two side arms 712 pivoted on the shaft 702. One of these arms 712 is connected by a link 802 (Fig. 2) with the plate 801 that oscillates with the shaft 800. During the forward stroke of the machine, the arms 712 are rocked counterclockwise (Fig. 2) which moves the bail 709 out of engagement with the tails of the firing members 716 so that they are free to move under the action of their springs 780 when the triggers 717 are released. During the return stroke of the machine the arms 712 are rocked clockwise during which movement the bail 709 engages the tails of the firing members 716 and moves them back to normal.

*Operating printing mechanism to the left of the last order to the left in which an actuator rack is moved*

The printing mechanism just described is normally conditioned so that it is disabled in all orders to the left of the last order to the left in which a key is depressed or an actuator moved during a machine operation. In order to print characters to the left of the amount of a check, it is necessary to have the printing mechanism operate to the left of the last digit that is printed and this requires a special control of the printing mechanism. During the description of this mechanism reference will be made, for convenience, to printing characters to the left before the means for indexing the mechanism for this purpose is described. It will be understood that the indexing mechanism will be eventually explained.

The printing mechanism is automatically conditioned for this purpose by the paper carriage and the control partakes of some of the features disclosed in Gascon Patent 1,395,991, but differs therefrom in a number of particulars that will be described.

Referring to Fig. 1 the paper carriage is provided with a plurality of rollers 10 of varying sizes, "small", "medium", and "large", which act on the arm 11 of a pivoted yoke 12 having another arm 13 connected to a pivoted member 14. Connected to the upper end of the member 14 is a link 15 (Fig. 2) in the form of a rack having teeth that mesh with a pinion 16 (Fig. 3) fixed to a cam shaft 17. The rack 15 is urged to the left as viewed in Fig. 1 by a spring 18 (Fig. 2) and it normally occupies its Fig. 1 position. When one of the rollers 10 on the carriage engages the arm 11 the yoke 12 is rocked which, in turn, rocks the arm 14. This moves the rack 15 to the right in Fig. 1 a distance corresponding to the size of the roller, the rack preferably having four positions as indicated by the four notches in its lower edge with which a locking device cooperates to lock the rack in its various positions, said locking device not being illustrated but being shown in said Gascon patent.

The cam shaft 17 carries a plurality of cams 19 best illustrated in Fig. 3 and these cams, in the different positions of the cam shaft, act on the printing mechanism in different orders as will be later described.

Each of the triggers 717 (Fig. 3) has a link 20 pivoted to it which extends forward and the forward end of each link is forked to straddle a notched shaft 720 (Fig. 2) which serves to guide the links. Pivoted to each of the links in the seven right-hand banks of the machine is a member 21, each member being urged counterclockwise by a spring 22. In order to distinguish between the elements for the different banks or orders, these banks will be referred to as the first, second, third, fourth, etc., banks, or orders, the numbering being from right to left as illustrated in Fig. 3. Each of the members 21 except those in the first and sixth banks acts as a latch and these members will be hereinafter called latches.

When the machine is operated under normal conditions for ordinary calculating operations, the links 20 with their latches 21 move forward when their triggers 717 are rocked clockwise and the printing mechanism operates in the normal way to print the amount of each item and to print ciphers to the right in all banks to the right of the last bank to the left in which a digit is printed.

In order to eliminate printing in certain orders or banks, the cam shaft 17 is turned to cause the cams 19 to move selected latches 21 downwardly against the tension of their springs 22. When these latches are moved downwardly, the resulting action is different in different orders because of certain special constructions hereinafter described, but, for the present, a description of the action in the seventh bank will be sufficient.

When the latch 21 in the seventh bank is depressed its shoulder 23 projects into the path of a bail 24 pivoted at 25 and urged counterclockwise (Fig. 3) by a spring 26. Each of the arms of the bail has a rearwardly extending projection carrying a stud 27 that is positioned to engage the cam edge of the respective arms 712. It will be recalled that the arms 712 are oscillated at each operation of the machine, their movement in Fig. 3 being first counterclockwise from the position there shown during the forward stroke of the machine. After they have reached the limit of their movement in that direction, they are returned clockwise to the original position. Accordingly, as the machine operates, the bail 24 is rocked forward or clockwise (Fig. 3) at the beginning of the forward stroke of the machine and, if any of the latches 21 have been pushed downwardly so that the shoulders of said latches, as for example, the shoulder 23 of the latch 21 in the seventh bank, is in the path of the bail, said latches will be pulled forward and they, in turn, will pull forward their links 20 and trip their triggers 717. This tripping action occurs at the beginning of the forward stroke of the machine because the bail 24 is rocked as soon as the arms 712 start counterclockwise at the beginning of the forward stroke. Accordingly, the firing members 716 in the orders in which the latches 21 have been moved forward are released at the beginning of the forward stroke of the machine instead of near the end of it as in normal operation. The released firing members cannot immediately move to fire their hammers 715 because the restoring bail 709 has not yet moved upward to free them. The firing members can only move to firing position as the restoring bail moves and it moves relatively slowly. The result is that the firing members do not move their hammers 715 with sufficient force to give them enough momentum to effect a printing action. In other words, when one of the latches 21 is pulled forward at the beginning of the forward stroke of the machine, the printing mechanism for that bank is disabled and printing in said bank eliminated.

The printing of characters to the left of an amount of a check must take place under all the different conditions that may arise in check writing. For example, a check may be for cents only, or for one dollar, or for a thousand or more dollars. Also, the dollars only are written in one place on the check without writing the cents, and the cents are written in another place without writing the dollars, and both the dollars and the cents are written at a third place on the check. These conditions require special control of the printing mechanism.

*Printing to left where dollars only are to be printed*

This subject will be first treated with respect to the control in the column where dollars only are printed even though the check is to also include a certain amount in cents.

When dollars only are to be printed, it is necessary to disable the printing mechanism in the cents order and to provide for printing characters to the left of the last digit to the left in the dollars orders.

The "medium" roll 10 on the carriage controls this condition and it is positioned so that, when the carriage reaches the column where dollars only are to be printed, it acts through the connections heretofore described to move the cam shaft 17 to the position shown in Fig. 7 where the cams 19 in the second, third, fourth and fifth orders depress the latches 21 in said orders or banks. The latch 21 in the second order, which is the tens of cents order, has a lateral lug 30 (Fig. 3) which is adapted to be positioned in the path of the bail 24 that is operated to "walk out" the printing mechanism. The cam 19 in the second order is of sufficient length to depress the latch 21 in said bank so as to position the lug 30 in the path of the bail 24 and hence, when the machine is operated, the latch 21 in the second order will be moved forward and the hammer 715 in that bank will be "walked out". Referring to Fig. 5 it will be noted that the triggers 717 in the first and second orders are connected together by a stud 31 so that, when the trigger 717 in the second order is "walked out", as above described, the trigger in the first order will be "walked out" also and printing is thus eliminated in both of the cents orders. This prevents the printing of cents in the column where dollars only are to be printed.

Referring to Fig. 3, the latches 21 in the third, fourth and fifth orders each carry a lateral stud 32 adapted, under certain conditions to engage the laterally bent front ends 33 of the links 20 in the fourth, fifth, and sixth banks. When any one of the latches 21 in the dollars orders is moved downwardly by the cams 19, the stud 32 of said latch is moved down so that, if the latch is moved forward its stud will engage the bent end 33 of the link 20 in the order immediately to the left of it. The number of banks provided with studs 32 can be varied to suit the requirements, three being shown in Fig. 3. The latches 21 in the fourth, fifth and sixth banks are not provided with shoulders 23 such as possessed by the latch 21 in the seventh bank. When the machine is in the column where dollars only are to be printed, the latches in the third, fourth and fifth orders are all depressed. Assume that one of the type segments in the dollars orders has been indexed, as, for example, the first or units of dollars order which is the third bank from the right. The printing hammer in this order is conditioned for firing in the usual manner, at the end of the forward stroke of the machine. The forward movement of the link 20 in the third bank during the cocking operation moves the latch 21 of said bank and those of the fourth, fifth and sixth banks forward so as to fire the hammers in all of said banks. This causes a digit to be printed in the third bank and causes printing in the fourth, fifth and sixth banks and, as will be later explained, this printing is of special character.

From the mechanism so far described it will be clear that the operation of the printing mechanism to the left is effected by the mechanism in the dollars orders which causes operation of latches to the left. But a special condition arises when a check is for cents only.

When the amount of the check is for cents only it is, nevertheless, necessary to print characters in the space where dollars only are to be printed, as shown, for example, in check No. 1001, Fig. 13. The mechanism just described depends for its operation upon the indexing of one of the dollar type segments so as to cause firing of a latch in at least one of the dollars orders. This mechanism would not operate to print characters to the left if this indexing did not occur and it would not occur if the check were for less than $1.00. To meet this condition the printing of characters to the left when no dollars are to be printed is placed under the control of the cents orders.

As shown in Fig. 4, the lateral lug 30 on the latch 21 of the second or tens of cents order is provided with a stepped plate 35 having an upper shoulder 36 and a lower shoulder 37. These shoulders are adapted to contact the laterally bent end 38 (Fig. 3) of the latch 21 in the third or units of dollars order. This latch 21 in the third order has a shoulder 39 adapted to engage the lateral lug 30 on the latch 21 of the second bank under certain conditions hereinafter described but, when the latch 21 in the second bank is moved down by the cam 19 as shown in Fig. 7, the lug 30 is moved out of the path of the shoulder 39 and the shoulder 36 of the stepped plate 35 is moved down so that it is in position to contact the laterally bent end 38 of the latch 21 of the third bank. As will be clear from Fig. 3, the shoulder 36 is spaced from the bent end 38 of the latch 21 of the third bank when the parts are in their normal unoperated position. The latch 21 in the second bank is moved forward by the bail 24 during the forward stroke of the machine under the conditions being described, that is, with the cams 19 depressing the latches 21 in the second, third, fourth and fifth banks. The initial forward movement of the latch 21 in the second bank, which is for the purpose of walking out the hammer in said bank, does not cause the shoulder 36 to engage the bent end 38 of the latch in the third bank, but such engagement occurs near the end of the forward stroke of the machine and at a time such that a firing action will take place in the third bank. The cam edges of the arms 712 that move the bail 24 are shaped so as to first move the bail suddenly. The cam edges are then concentric with their pivots so that no further movement of bail 24 by the arms 712 occurs during the major portion of the forward stroke of the machine. However, the forward ends of the cam edges of the arm 712 are provided with raised portions 40 which, near the end of the forward stroke of the machine, cam the studs 27 upward a slight additional distance which moves the bail 24 farther forward and this movement causes shoulder 36 to engage the bent end 38 on the latch 21 in the third bank, with the result that said latch is moved far enough forward to trip its trigger 717. The bail 709 has moved out of the way of the firing members during the forward stroke of the machine and hence, when the trigger 717 operates in the third bank, the firing member in that bank will be fired. It will be recalled that the latches 21 in the third, fourth and fifth banks have been depressed far enough to position their studs 32 in the path of the bent ends 33 of the links 20 in the fourth, fifth and sixth banks. Accordingly, when the latch 21 in the third bank is moved forward near the end of the forward stroke of the machine, the latches 21 in the fourth, fifth and sixth banks are also moved forward at that time. This causes firing of the hammers in the fourth, fifth and sixth banks and the printing mechanism is thus operated in the four banks to the left of the cents orders. In this manner the entire space reserved for dollars only is filled with special characters and no cents are printed.

When the carriage reaches the column where cents only are to be printed, (check #1001, Fig. 13), it is not necessary to print characters to the left. The mechanism for printing characters to the left must be disabled in this column and this is accomplished as follows:

*Printing where cents only are to be printed*

When the carriage reaches the position where only cents are to be printed, a "large" roller 10 operates on the connections controlling the cam shaft 17 to cause it to move to the position shown in Fig. 8 where the latches 21 in the seventh and in the second banks are depressed by cams 19.

The machine is conditioned for the taking of a subtotal in this column because it is desired that the amount of the check remain in the machine in order that it may be printed in the next position. This conditioning may be accomplished by hand in the well-known manner or automatically under the control of the carriage as described in Patent No. 1,854,216.

Depression of the latch 21 in the seventh bank moves its shoulder 23 into the path of the bail 24 and hence, when the machine is operated, the trigger 717 in the seventh bank is tripped at the beginning of the forward stroke of the machine and the hammer 715 in the seventh bank is "walked out". As shown in Fig. 5, the trigger 717 in the seventh, sixth, fifth and fourth banks have tails 9 that overlap the triggers to the right. Accordingly, when the seventh bank trigger 717 is "walked out" the triggers in the sixth, fifth, fourth and third banks are likewise "walked out" and no printing will occur in the dollars orders.

The cam 19 that depresses the latch in the second bank is long enough to move the latch down so that the lateral lug 30 on latch 21 of the second bank will be below the shoulder 39 on the latch 21 of the third bank. As above explained, the trigger 717 of the third bank is tripped by reason of the overlapping tails between certain of the triggers to the left of it and, if the latch 21 of the second bank were not moved down so as to move the lug 30 out of the path of the shoulder 39, the latch 21 in the third bank, when moved forward at the beginning of the forward stroke of the machine would move latch 21 of the second bank and disable the printing mechanism in the second order.

The downward movement of latch 21 in the second bank is not sufficient to position its lateral lug 30 in the path of the bail 24 and hence said latch is not moved forward by the bail.

Accordingly, the printing mechanism in the cents orders, that is, in the first and second banks at the right of the machine, remains in normal condition and will operate to print cents in the usual manner.

If the check should happen to be for dollars without any cents, it would be necessary to print ciphers in the space that is left for cents only. Under these conditions, the printing mechanism in the cents orders would not be indexed and since the dollars order printing mechanism is disabled, as above explained, no printing of ciphers in the cents orders would occur unless some further provision is made.

An extra trigger 717 is provided for this purpose which is located to the right of the first bank as shown in Fig. 5. This extra trigger has a tail 9 extending to the left instead of to the right and overlapping the trigger 717 of the first bank. The especial trigger has the usual elements of the printing mechanism associated with it and it is operated in the same way as the other triggers and its bank will be referred to as the "X" bank. Instead of being controlled by an actuator, it is controlled by the means for conditioning the machine for taking totals or subtotals. In fact, the construction is like that described in the White Patent No. 1,018,285 which relates to a special section of the printing mechanism used for character printing except, that in this case, no characters are placed on the type segments and no printing takes place in the "X" bank. However, when the machine is conditioned for the taking of a total or a subtotal, the special trigger 717 is released as for printing. When it is released it releases the trigger in the first bank and, since the triggers in the first and second banks are connected together, the triggers in both cents orders will be released and a printing operation will occur.

*Printing the entire amount of the check*

After the amount of the check in dollars has been printed at one place and the amount in cents at another, it is desirable to print the entire amount of the check at the right hand end of it in the usual place where figures occur.

For this printing a "small" roll on the paper carriage controls the connections for moving the cam shaft 17 and the shaft is moved to the position illustrated in Fig. 6 where it will be seen that cams 19 depress the latches 21 in the third, fourth and fifth banks of the machine. This moves these latches down to a position such that their studs 32 are behind the bent ends 33 of the links 20 in the fourth, fifth and sixth banks.

If the check is for an amount in dollars, the printing mechanism in one of the dollars orders will be fired and the studs 32 operating on the bent ends 33 of the links 20 will cause the printing mechanism in orders to the left to be fired to print characters.

If the check should be for an amount in dollars without any cents, ciphers are printed in both the cents columns. The shoulder 39 on the latch 21 of the third bank engages the lateral lug 30 on latch 21 of the second bank and releases the trigger in the second bank at the same time that the triggers in the third, fourth, fifth and sixth banks are released. Inasmuch as the triggers 717 in the second and first banks are connected together, the triggers in both of the cents orders are released along with the triggers in the dollars orders. These cents order triggers will also be fired at this time by reason of the trigger in the "X" bank because, usually, the machine is conditioned for total taking when the carriage is in position for printing the total amount of the check.

In case the check should be for an amount in cents only, special characters must be printed to the left of the cents orders. Under this condition, the printing mechanism in the cents orders is indexed and, as the latch 21 of the second bank moves forward, the shoulder 37 on the stepped plate 35 engages the bent end 38 of the latch 21 of the third bank, or first dollars order (Fig. 6), near the end of the forward stroke of the machine and fires the printing mechanism in the third bank at the same time that the cents order printing mechanism is fired. Inasmuch as the units dollars order printing mechanism is connected to the orders to the left of it, printing occurs in these banks also.

Check writing operations

The operation of the machine in the writing of checks may be varied, but the following is typical:

When the machine is to be used for writing checks only, the blank checks are placed in the paper carriage either one at a time or in the form of a strip. The names of the payees are already printed on the check. The amount of the check is entered on the keys and the machine given a stroke of operation which results in entering the amount of the check in one of the registers. The printing mechanism is operated to print this amount, but the check is preferably not under the printing mechanism in this carriage position so that nothing appears on the check. If it is desired to keep a record of the amounts of the checks, a record strip may be placed in the machine in position to receive the impression of the printing mechanism during the above operation. After the amount of the check has thus been entered in a register, the carriage tabulates to its next position which is the position for printing dollars only. In this position the machine is conditioned either by hand or automatically for the taking of a subtotal, so that when the machine is operated, the printing mechanism will be operated to print the amount of the check. But, because of the "medium" roller that operates as already described, the printing mechanism in the cents orders is disabled and the amount of the check in dollars with characters to the left is printed or, if the check is for cents only, then characters only are printed.

After this operation takes place, the carriage tabulates to its next position where the cents only are to be printed. Here again, the machine is conditioned for the taking of a sub-total and the printing mechanism will be operated but, by reason of the "large" roller that is active in this position, the printing mechanism is conditioned so that it operates only in the cents orders and not in the dollars orders.

After this operation has been completed, the carriage automatically tabulates to its next position where the amount of the check in both dollars and cents is printed. In this columnar position of the carriage, the machine is preferably conditioned for total-taking which will cause the printing mechanism to be operated and the register to be cleared. The "small" roller is active in this position to condition the printing mechanism so as to print the total amount of a check and to operate the printing mechanism in banks to the left of the last bank to the left in which a digit is printed no matter whether this last bank to the left is in the tens of cents order or in the dollars orders.

After a check has been written as above described, the carriage automatically returns across the machine to its original position for the writing of another check.

In the event the machine is to be used for ledger posting or other bookkeeping operations in combination with checkwriting, a ledger sheet is inserted in the paper carriage at the same time that the check blank is placed therein.

The machine is then conditioned to receive a given item which is entered in the register and printed on the ledger sheet. The carriage then tabulates to the next column where another item may be added or subtracted to the amount in the register and recorded. The carriage then tabulates to a third column where a sub-total of the amount in the register is taken and printed on the ledger sheet. In this column, the printing mechanism is preferably conditioned in the same way as it is in the column where the total amount of the check is printed so that when the total is printed on the ledger sheet it will have characters to the left of it the same as the check.

After the total has been printed on the ledger sheet, the machine preferably goes ahead automatically to write the check without requiring any attention on the part of the operator. This is accomplished by providing the machine with an automatic repeat mechanism such as disclosed in Müller Patent No. 1,397,774 which causes the machine to go through a series of operations automatically. In fact, the machine continues to operate and the paper carriage continues to tabulate to the various positions for check writing and the carriage returns across the machine to its original position without requiring any attention.

The machine can also be used for check writing when it is not desired to take totals or sub-totals. In this event the amount keys that are depressed at the time the amount of the check is entered are held depressed throughout the various operations by means of a repeat key mechanism which has not been illustrated as it is well known in Burroughs machines. The carriage then tabulates or can be tabulated from column to column in check writing in the manner heretofore described and the "small", "medium" and "large" rollers operate as already explained. The printing mechanism is indexed in this case by the depressed amount keys rather than by the register.

The description thus far has referred to special character printing without indicating how the printing mechanism is indexed to print these characters, because it has been necessary to understand the operation of the printing mechanism before the indexing for special characters can be clearly understood. The mechanism for properly indexing the special characters will now be described.

Special character indexing

As previously explained the connection between the type carrying members and the actuators is such that the type carrying members may move a step relative to the actuators even though the actuators are not moved. This allows the "0" types to be moved to printing position in the orders in which the actuators are not moved during an operation of the machine. There are two conditions under which the actuators are not moved. First, when printing occurs in total or subtotal taking, the actuators do not move in the orders where the register pinions are at zero. Second, when printing occurs of an item entered in the amount keys, the actuators do not move in the banks in which no amount keys are depressed.

The orders to the left in which the printing mechanism is actuated through the connections heretofore described are orders in which the actuators are not moved during a machine operation and these are orders in which the type carrying members would be positioned to print zeros at the time the printing mechanism operates. It is not desired to print "0's" to the left of the last digit to the left because "0's" are not distinctive enough and could be changed on a check. Also, they are confusing. If special characters, such as asterisks, were to be substituted for the "0's" on the type carrying members, the desired result of printing characters to the left could be accomplished, but the difficulty is that, when a check of large amount is printed in which some of the dollars orders to the right are to be represented by "0's", asterisks would be printed instead of "0's" and the amount of the check would not be clearly defined. The present invention provides a solution for this problem.

Mounted at the front of the machine (Fig. 1) is a yoke-shaped bail 50 pivoted at 51 on the machine frame plate 52. This bail carries a series of bearing brackets 53 which are fixed to it and which extend toward the machine, there being a bracket in each order of the machine in which a control for special characters is desired. In the embodiment of the invention illustrated, bearing brackets have been shown in four orders, namely, the third, fourth, fifth and sixth orders or banks from the right of the machine when viewed as from the front. These are the units, tens, hundreds and thousands of dollars orders. It will be understood, of course, that other orders can be chosen and a greater or less number of banks can be provided with bearing brackets 53.

Pivoted on each of the bearing brackets is a bell crank lever 54 (Fig. 10) urged clockwise by a spring 55 connected at one end to the bell crank lever and at its other end to the bracket 53. The clockwise movement of the bell crank lever is limited by its engagement with the edge 56 of bracket 53. One arm 57 of the lever 54 extends substantially horizontally toward the machine and this arm has a bent end or lug 58 that forms a feeler for the register pinion 910 of its respective order. Each of the register pinions is provided with a circular disk 60 having a notch 61 for receiving the bent end 58 of the arm 57 when the register pinion is in "0" position.

The other arm of the bell crank 54 extends upwardly and it is connected by a pin and slot connection to the middle arm 62 of a three-armed lever 63 fastened to a short shaft 64 located between and pivoted in the stationary plates 210 (Fig. 12) of the machine. The lever 63 has a rearwardly extending arm 65 provided with a shouldered nose 66 adapted to engage under the stud 67 on the type carrying member 611.

The parts just described normally occupy the position illustrated in Fig. 10 where they are inactive. The bell crank lever 54 cannot rock any farther clockwise because its edge engages the edge 56 of the bracket 53. The nose 66 of the arm 65 cannot move under the stud 67 because the three-armed lever 63 is held in the position of Fig. 10 by the bell crank lever 54. The mechanism will be referred to as a latching mechanism because it is operable to latch the type carrying member 611 against counterclockwise movement as illustrated in Fig. 11.

In orders in which characters are to be printed, the type carrying members 611 are provided, in the usual manner, with digits from "0" to "9", inclusive, but the top type, instead of carrying the "0" and the "1" type only, carries an additional point 68 for printing a special character, which in the embodiment illustrated, is an asterisk. The type point 68 is positioned so that, when the type carrying member 611 is in its normal position at the time the machine is at rest, the special character is in position for printing but, when the machine is operated and the type carrying member moves a step relative to its actuator, the "0" type will be moved up to printing position if the actuator is not moved. If the actuator is moved to index a digit, the extra step of movement positions the type carrying member to print the proper digit corresponding to the indexing of the actuator.

Means is provided for moving the latching mechanism to latching position and, in the embodiment illustrated, this means is actuated by and automatically controlled by the paper carriage. Referring to Fig. 1, it will be observed that the yoke-shaped bail 50 has a downwardly extending arm 70 to which is connected a spring 71 that urges the bail in a counter-clockwise direction. Connected to the lower end of the arm 70 is a link 72 whose rear end is connected to an arm 73 fixed to a shaft 74 on the base of the machine. This shaft has another arm 75 extending rearwardly and provided with a stud 76 operating in a slot in the end of a link 77 on a lever 78 pivoted at 79 to a bracket on the base of the machine. There is a yielding connection between the arm 75 and the lever 78 comprising a spring 80 connected between the stud 76 on the arm 75 and a stud 81 on the lever 78. The rear end of the lever 78 is connected to a vertically movable slide 82 having a stud 83 on its upper end adapted to be engaged by suitable cam slides 84 (Fig. 9) on the rod 85 on the paper carriage. When the carriage reaches predetermined columnar positions a slide 84 engages the stud 83 which pushes the slide 82 downward. This rocks the lever 78 clockwise and the latter, through the spring 80, moves the arm 75 counterclockwise. This causes the counterclockwise movement of shaft 74 and arm 73 with the result that the link 72 is thrust forward and the bail 50 is rocked clockwise on its pivot 51.

When the bail 50 is rocked clockwise, the bearing brackets 53 are likewise rocked in this direction and this carries the bell crank levers 54 bodily counterclockwise about the axis of pivot 51. If, at the time this occurs, the register pinion in a given order is in its "0" position, the bell crank lever 54 in that order will be moved to the position of Fig. 11 and this lever will rock its three-armed lever 63 counterclockwise so that the nose 66 will move under the stud 67 on the type-carrying member 611. This latches the type-carrying member against movement relative to its actuator so that, when the machine is operated, the type-carrying member will not move its usual step relative to its actuator with the result that the special character type will remain in position for printing instead of the "0" type being moved to position.

In any order in which the register pinion is not in its "0" position at the time the bail 58 is rocked clockwise, the bent end 58 of the arm 57 will strike the face of disk 60 instead of entering the notch 61. Then, as the bail 58 is rocked clockwise, the bell crank 54 will be rocked on its pivot against the tension of its spring 55 and, instead of the bell crank 54 rocking the three-armed lever 63 to latching position, said bell crank and its lever 63 will be held in their inactive position because of the bent end 58 engaging the periphery of the disk 60 and no latching of the type-carrying member will occur. Accordingly, in all orders in which register pinions are not at "0", the type-carrying members will not be latched against movement relative to the actuators and said members can move their extra step of movement to "0" position or beyond to position "0's" and/or to position the proper digit types for the digits for which the actuators are indexed.

Having in mind that the printing mechanism is operated in orders to the left of the last order to the left in which an actuator rack moves, it will be clear that special characters will be printed in these orders to the left in which the printing mechanism is operated.

Other conditions must be considered, however. Assume that a check is to be written for an amount such as $1,000.00. When writing such an amount "0" should be printed in the units, tens, and hundreds of dollars orders. These are orders, however, in which latches have been provided for the type-carrying members and they are also orders in which the actuators do not move and in which the register pinions are at zero at the time the machine operation takes place. With the mechanism described up to this point, special characters would be printed in these orders instead of "0", so that the check would read $1°°°.00. Provision has been made to avoid this by mechanism as follows:

Referring to Fig. 9, it will be observed that the third arms 90 of the three-armed levers 63 extend forwardly and the forward ends of these arms are provided with overlapping projections 91 to the left. This means that, if any of the three-armed levers or latches 63 is held in its inactive position, all of the latches to the right of it will also be held in inactive position even though the other portions of the mechanism for these latches may be conditioned to have the latches moved to latching position. In the example given ($1000.00), the register pinion in the thousands of dollars order is not in "0" position at the time the printing operation takes place, hence the latch 63 in the thousands of dollars order will not move to latching position. The thousands latch will hold out the latch in the hundreds of dollars order, the latch in the hundreds order will hold out the latch in the tens of dollars order, and the latch in the tens order will hold out the latch in the units of dollars order. Instead of these latches moving to position to latch the type-carrying members in character printing position, they will remain in their disabled or inactive position and the type carrying members will move relative to their actuators so as to position the "0" types for printing. In this way "0's" are always printed in their proper places to the right under conditions that demand such printing and this occurs without interfering with the printing of special characters to the left.

In the writing of checks, the carriage control cams 84 are preferably positioned so as to act on the latching mechanism in columnar positions where totaling or subtotaling is to occur, it being recalled that while the check is being printed, the machine goes through subtotaling and totaling operations in different columns. The tabulation of the carriage from one column to another occurs at the end of the return stroke of operation. Hence, immediately preceding a subtotaling operation the carriage moves to the columnar position where the subtotaling operation is to be performed. In the machine described the adding register is normally in engagement with the actuators before the machine operates. At the beginning of operations in addition it is rocked out of engagement with the actuators immediately, but during totaling or subtotaling operations, it is allowed to remain in engagement with the actuators during their descent. Accordingly, at the time the paper carriage moves to its total or subtotaling position to actuate the latching mechanism, the register is in engagement with the actuators and the latching mechanism will be controlled by the position of the register pinions at that time. In the orders where the register pinions are at "0" the type-carrying members will be latched in character printing position. In the other orders no such latching occurs. While the register pinions in said "other" orders may eventually be rotated to "0" by the totaling or subtotaling operation, the actuators and type-carrying members will have moved downwardly far enough in the meantime so as to be beyond the latches and hence, even though the latches are moved to latching position when the pinions reached their "0" position, no actual latching of the type-carrying members occurs because such type-carrying members are out of the range of the latches.

*Key control of special characters to left*

For certain kinds of work it is not desirable to print the amounts of checks by a subtotal and totaling operation of the machine, but to print checks for amounts entered on the amount keys. A different species of the invention has been shown for this purpose and, in this species, control of the printing of special characters to the left is placed under the amount keys on the keyboard. This species is illustrated in Fig. 12.

The type-carrying members 611 are the same as those previously described and somewhat different shaped three-armed levers or latches 63 are provided for these type-carrying members in the orders in which it is desired to print special characters. These latches differ from those heretofore described in that no provision is made for controlling them by the register pinions. The latches are urged in a counterclockwise direction, as viewed in Fig. 12, by springs 100 so that their normal position is a latching position with the noses 66 under the studs 67. The type-carrying members 611 are thus normally latched in character printing position. Overlapping projections 91 are provided on arms 90 so that, when any particular latch is held in unlatched position, all latches to the right of it, or in lower orders, are likewise held in such position.

In this species each of the latches 63 has an upwardly extending projection 101 positioned behind a downwardly extending lug 102 on the key locking plate 214 of its bank. Whenever any of the amount keys in a bank is depressed the latch plate 214 for that bank is moved rearwardly and held in rearward position by the detent 228 until near the end of the return stroke of the operation when the restoring bail 229 releases the detents 228 to enable the latch plates to move forward to normal position.

With this construction, when an amount key in a given bank is depressed, the key locking plate for that bank is moved rearwardly and the latch 63 for said bank is moved clockwise to released position so as to permit movement of the type carrying member of said bank relative to its actuator to thereby enable the proper digit type to be positioned for the key that has been depressed.

However, in any bank to the left of the last bank to the left in which an amount key has been depressed, the latches 63 will not be released and the type carrying members in said banks will be latched against movement so that the special character types will be positioned for printing in said banks.

No amount keys are depressed in banks to the left of the last bank to the left in which a key is depressed for writing a check and no actuators are moved in said banks to the left during a machine operation. But the printing mechanism is operated in said banks to the left by reason of the construction heretofore described, the carriage being provided with suitable rolls for this purpose. Special characters will thus be printed in the orders to the left of the amount of the check. Such special characters will not be printed to the right of the last digit to the left even though amount keys may not be depressed in some of the banks to the right. This is true because the overlapping projections 91 on the latches will cause all latches to the right of any particular latch that is released to be released with it.

In this way the printing of special characters occurs in banks to the left of the last bank to the left in which a key is depressed, or to put it in another way, to the left of the last bank to the left in which an actuator rack is moved during a machine operation.

It is sometimes desirable to use the machine for operations other than check writing in which event it would not be convenient to have special characters printed at any time as these would appear in columns where "0's" should appear. Accordingly, provision has been made for disabling all of the latches 63.

Each of these latches is provided with a stud 103 positioned to be engaged by a cam face 104 on an arm 105 of a yoke-shaped bail 106 mounted at the front of the machine in the same manner as the bail 50 heretofore described. This bail has a downwardly extending arm 107 to which a spring 108 is connected that normally maintains the bail in the position of Fig. 12. This arm is connected by a link 72 to a series of links and levers similar to those heretofore described and controlled by the paper carriage and identified by the reference numerals 73, 75, 77, 78 and 82 (Fig. 1). Cams 84 on the paper carriage are positioned so that, in columns where it is not desired to have the latches 63 in latched position, the cams operate to rock the bail 106 clockwise whereupon the cam surfaces 104 on the arms 105 rock all of the latches 63 clockwise to disabled position.

As soon as the carriage moves away from the particular column where this occurs, the parts will return to normal, unless the next succeeding column is also one where it is desired to have the latches disabled, in which event the latter column is also provided with a suitable control cam on the carriage. The latches are thus automatically disabled in certain columnar positions of the carriage.

*Examples of work*

Several typical examples of work are shown in Fig. 13, which will be described briefly.

The first example involves the writing of a check for cents only. The amount of 50¢ is first entered on the amount keys and the machine operated to print 50¢ in the proper column on a ledger sheet, the amount being added in the register. At the same time the number of the check is printed by a consecutive numbering mechanism not shown.

The carriage then tabulates to the next column where an addition of 20¢ is to be made. This amount is entered on the amount keys and, when the machine is operated, it is printed in the appropriate column and added in the register.

The machine then tabulates to a column where a total is to be printed. The subtotal key is depressed and the machine operated in this column whereupon the total is printed and special characters are printed to the left in all of the dollars columns. The printing mechanism is operated in these dollars columns by the special connections heretofore described and characters are printed instead of "0's" because the paper carriage is provided with suitable cams to condition the latching mechanism in a manner heretofore described.

After the total is printed on a ledger sheet the machine continues to operate automatically and tabulates from column to column under the control of the automatic repeat mechanism.

When the carriage reaches the column where the amount of the check in dollars is to be printed without printing the cents, the machine is conditioned for subtotaling and the carriage control of the printing mechanism conditions said mechanism so that it is operated in the dollars column only and special characters are printed in these orders, the carriage being provided with a suitable cam to control the latching mechanism in this column also.

When the carriage reaches the next column where the cents are to be printed without the dollars, the machine is again conditioned for subtotaling and the printing mechanism is again conditioned for printing. In this column, the printing mechanism in the dollars orders is not operated so that neither special characters nor ciphers appear in the dollars order.

The machine next tabulates to the column where the amount of the check in both dollars and cents is to be printed. The machine is conditioned for totaling and the printing mechanism is conditioned for printing both dollars and cents in said column. The latching mechanism for controlling the printing of special characters is conditioned so that special characters will be printed in the orders to the left of the last order to the left in which a digit is printed.

The next example involves the printing of a check for $5.25. The operation is substantially the same as above described except that, in the column on the check where dollars only are to be printed, the control of the printing mechanism is slightly different than where no dollars are to be printed, but this has been described and need not be again explained in detail. So far as the printing of special characters to the left is concerned, this occurs in orders to the left of the units of dollars order in the same manner as in the first example, such special character not being printed in the units of dollars order because the type carrying member in that order is indexed to print "5".

The next example involves the printing of a check for $50.25. Here again the operation is substantially the same as in the first example and, as far as the control of the printing mechanism is concerned, it is exactly the same as the case of the check for $5.25. In this example, however, it is necessary to print a "0" in the units of dollars order instead of a special character and this is accomplished by reason of the fact that the latch in the tens of dollars order is not permitted to latch its type carrying member to its actuator and said latch disables the latch in the units of dollars order so that a "0" is printed in the units order instead of a special character.

I claim:

1. A calculating machine having a plural order differential mechanism, a printing mechanism having plural order type-carrying members controlled by said differential mechanism and supporting types including a zero and a special character type, said type-carrying members normally occupying positions relative to said differential mechanism for printing special characters but being releasable for a limited movement relative to said mechanism as the machine is operated to thereby enable said type-carrying members to move to position to print zeros in the orders in which the differential mechanism is not moved during a machine operation, and means preventing said limited movement of said type-carrying members in all orders to the left of the last order to the left in which the differential mechanism is moved during a machine operation to thereby position said type-carrying members in said left-hand orders to print special characters in said orders instead of zeros.

2. A calculating machine having a plurality of banks of depressible amount keys, a plurality of actuators movable to differential positions during a machine operation, type segments carrying types including digit types and a special character type, connections between said type segments and actuators enabling said type segments to move a limited amount relative to said actuators during a machine operation to thereby enable the type segments in the banks in which a key is depressed to move to position to print the proper digits corresponding to the depressed keys and the type segments in the banks in which no keys are depressed to move to position to print zeros in said banks, and means preventing said limited movement of said type segments in all orders to the left of the last order to the left in which a key is depressed to thereby position the type-carrying members for said orders to print special characters instead of zeros.

3. A calculating machine having a plural order differential mechanism, a printing mechanism having plural order type-carrying members supporting type, means normally positioning said type-carrying members in a given position during a printing operation in the orders in which the differential mechanism is not moved, a traveling paper carriage, and means controlled by said paper carriage acting in predetermined columnar positions of said carriage to cause said type-carrying members to be positioned during a printing operation in a different position than normal in the orders in which the differential mechanism is not released.

4. A calculating machine having a plurality of differentially movable actuator racks, a plurality of type segments carrying types adapted for normal printing operations and other types for special operations, connections between said type segments and racks permitting a limited relative movement between said segments and racks, a traveling paper carriage, and means controlled by said paper carriage for controlling said type segments in their limited movement in the orders in which the actuator racks are not moved during a printing operation whereby said type segments may be positioned to print characters other than normal.

5. A calculating machine having a plurality of actuators movable to differential positions during operation of the machine, type segments carrying a plurality of types including a zero and a special character type, connections between said type segments and actuators enabling said type segments to move a limited amount relative to said actuators during a machine operation to enable the type segments in the orders in which actuators are not moved during a machine operation to move to position to print zeros in said orders, latching mechanism for preventing said relative movement of said type segments, a paper carriage, and means under the control of said paper carriage acting in predetermined columnar positions of said carriage to move said latching mechanism to latching position in the orders in which the actuators are not released during an operation of the machine to thereby cause the type segments in said orders to be positioned to print special characters instead of zeros.

6. A calculating machine having a plural order differential mechanism, a printing mechanism having plural order type-carrying members controlled by said differential mechanism and supporting types including a zero type and a special character type, said type-carrying members being normally conditioned to print zeros during a printing operation in the orders in which the differential mechanism is not moved during a machine operation, a register, and means under the control of said register for positioning the type-carrying members in the orders in which the differential mechanism is not moved during a machine operation to print special characters in said orders instead of zeros.

7. A calculating machine having a plural order differential mechanism, a printing mechanism having plural order type-carrying members controlled by said differential mechanism and supporting types including a zero and a special character type, said type-carrying members being normally conditioned to print zeros in the orders in which the differential mechanism is not moved during a machine operation, a register having a plurality of pinions of different orders, and means under the control of said register pinions for causing the type-carrying members in the orders in which the register pinions are in zero position at the time a printing operation occurs to be positioned to print special characters in said orders instead of zeros.

8. A calculating machine having a plural order differential mechanism, a printing mechanism having plural order type-carrying members controlled by said differential mechanism and supporting types including a zero and a special character type, said type-carrying members being normally positioned to print special characters, means normally operating during a machine operation to cause said type-carrying members to be moved to positions to print zeros in the orders in which the differential mechanism is not moved during said machine operation, a register having a plurality of pinions of different orders, and means under the control of said register for preventing movement of the type-carrying members in the orders in which the differential mechanism is not moved during a machine operation to thereby cause special characters to be printed in said orders instead of zeros.

9. A calculating machine having a plural order differential mechanism, a printing mechanism having plural order type-carrying members controlled by said differential mechanism and supporting types including a zero and a special character type, said type-carrying members being normally positioned to print special characters, means normally causing said type-carrying members to be moved during a machine operation to positions to print zeros in the orders in which the differential mechanism is not moved during said machine operation, a register having a plurality of pinions of different orders, and associated with said type-carrying members including feeling mechanism for said register pinions acting to prevent movement of said type-carrying members in the orders in which the register pinions are in zero position to thereby cause special characters to be printed in said orders instead of zeros.

10. A calculating machine having a plurality of actuators movable to differential positions during operation of the machine, type segments controlled by said actuators and carrying a plurality of types including a zero and a special character type, connections between said type segments and actuators enabling said type segments to move a limited amount relative to said actuators during a machine operation whereby the type segments in the orders in which actuators are not moved during a machine operation will be positioned to print zeros in said orders, latching mechanism for preventing said relative movement of said type segments, a register having a plurality of register pinions, and means under the control of said register pinions for moving said latching mechanism to latching position to thereby cause the type segments in the orders in which the register pinions are at zero to be latched against movement to position them to print special characters instead of zeros.

11. A calculating machine having a plural order differential mechanism, a printing mechanism having plural order type-carrying members controlled by said differential mechanism and supporting a plurality of types including a zero and a special character type, said type-carrying members being normally conditioned to print zeros in the orders in which the differential mechanism is not moved during a machine operation, a register, a traveling paper carriage, and means under the joint control of said register and paper carriage causing said type-carrying members in the orders in which the differential mechanism is not moved during a machine operation to be positioned to print special characters in said orders instead of zeros.

12. A calculating machine having a plural order differential mechanism, a printing mechanism having plural order type-carrying members controlled by said differential mechanism and supporting a plurality of types including a zero and a special character type, said type carrying members being normally positioned to print zeros in the orders in which differential mechanism is not moved during a machine operation, a register having a plurality of pinions, a traveling paper carriage, and means under the joint-control of said paper carriage and said register pinions causing said type-carrying members in the orders in which the register pinions are in zero position to be positioned to print special characters in said orders instead of zeros.

13. A calculating machine having a plural order differential mechanism, a printing mechanism having plural order type-carrying members controlled by said differential mechanism and supporting types including a zero and a special character type, said type-carrying members being normally positioned to print zeros in the orders in which the differential mechanism is not released during an operation of the machine, a traveling paper carriage, a register having a plurality of pinions of orders corresponding to said differential mechanism, and means actuated by said paper carriage and controlled by said register pinions for causing said type-carrying members to be positioned to print characters in the orders in which the register pinions are in their zero positions at the time the machine operation takes place.

14. A calculating machine having a plurality of actuators movable to differential positions during operation of the machine, type segments carrying type including a zero and a special character type, connections between said actuators and type segments enabling said segments to move a limited amount relative to said actuators during a machine operation to enable the type segments in the orders in which the actuators are not released during a machine operation to move to positions to print zeros, latching mechanism for latching said type segments to said actuators to prevent said relative movement, a traveling paper carriage, a register having a plurality of pinions of orders corresponding to said actuators, and means actuated by said paper carriage in predetermined columnar positions thereof and controlled by said register pinions for moving said latching mechanism to latching position in the orders in which the register pinions are at zero.

15. A calculating machine having a plurality of actuators movable to differential positions during operation of the machine, type segments carrying types including a zero and a special character type, connections between said type segments and actuators enabling said type segments to move a limited amount relative to said actuators during a machine operation to enable the type segments in the orders in which actuators are not moved during a machine operation to be positioned to print zeros in said orders, a traveling paper carriage, a register having a plurality of pinions, latching mechanism for latching said type segments to said actuators to prevent said relative movement, means actuated by said paper carriage in predetermined columnar positions thereof for moving said latching mechanism to latching position, and feeling mechanism controlled by said register pinions for preventing movement of said latching mechanism to latching position in the orders in which the register pinions are not at zero at the time said latching mechanism is actuated by said carriage.

16. A calculating machine having a plurality of banks of depressible amount keys, a plurality of register actuators, a plurality of type segments supporting type, connections between said type segments and said actuators causing said type segments to move with said actuators, said connections also permitting a limited movement of said type segments relative to said actuators under the influence of an urging means tending to cause such movement, latches normally preventing said relative movement of said type segments, and means controlled by the keys of each bank for releasing the latches in the respective banks whereby, when a key in any given bank is depressed, the type segment in said bank will be released for movement relative to its actuator to cause a different relative positioning between the actuators and segments in banks in which keys have been depressed from that in banks in which no keys have been depressed.

17. A calculating machine having a plurality of banks of depressible amount keys, a plurality of differentially movable register actuators, type segments supporting types including digit types and a special character type, connections between said type segments and actuators causing said segments to move with said actuators, said connections also permitting a limited movement of said segments relative to their respective actuators under the influence of an urging means tending to cause such movement, latches normally preventing said relative movement of said type segments whereby the type segments are normally positioned to print characters in the orders in which the actuators are not moved during an operation of the machine and means controlled by the keys of each bank for releasing the latches in the respective banks whereby, when a key in any bank is depressed, the latch in said bank is released to enable the type segment for said bank to move relative to its actuator to thereby position the proper digit corresponding to the depressed key.

18. A calculating machine having a plurality of differentially movable actuators, type segments supporting types including digit types and a special character type, connections between said type segments and actuators permitting a limited movement of said segments relative to said actuators under the influence of an urging means tending to cause such movement, latches normally preventing such movement whereby said type segments are positioned to print characters when the actuators are in their normal unmoved position, a traveling paper carriage, and means controlled by said carriage for disabling said latches.

19. A calculating machine having a plurality of differentially movable actuators, a plurality of type segments supporting type, said printing mechanism being normally inoperative in orders to the left of the last order in which an actuator rack is moved, connections between said type segments and actuators enabling said type segments to move a limited amount relative to said actuators during a machine operation to enable said type segments to move to position for printing zeros in orders in which no actuators are moved, means causing said printing mechanism to operate in orders to the left of the last order to the left in which an actuator is moved during a machine operation, and latching mechanism acting to prevent relative movement between said type segments and actuators in the orders in which the actuators are not moved during a machine operation to thereby position the type segments on said orders to print special characters instead of zeros, said latching mechanism including portions acting to disable the latches in all orders to the right of the last order to the left in which an actuator rack is moved during a machine operation.

20. A calculating machine having a plural order differential mechanism, printing mechanism having plural order type carrying members controlled by said differential mechanism and supporting types including a zero type and a special character type, said type carrying members being normally positioned to print zeros during a printing operation in the orders in which the printing mechanism is operated and in which the differential mechanism is not moved, means causing said printing mechanism to operate in orders to the left of the last order to the left in which the differential mechanism is moved, a register, and means under the control of said register for positioning said type carrying members in said orders to the left to print special characters instead of zeros.

21. A calculating machine having a plural order differential mechanism, a printing mechanism having plural order type carrying members controlled by said differential mechanism and supporting types including a zero type and a special character type, said type carrying members being normally positioned for the printing of zeros during a printing operation in the orders in which the differential mechanism is not moved, means causing said printing mechanism to operate in orders to the left of the last order to the left in which the differential mechanism is moved during a machine operation, a register, and means controlled by said register for positioning said type carrying members in the orders in which the register pinions are at zero to print special characters in said orders instead of zeros, said register controlled means including portions acting to disable the control by said register controlled means of all type segments to the right of the last order to the left in which a register pinion is out of zero position.

22. A calculating machine having a plurality of differentially movable actuators, printing mechanism including a plurality of type segments having types including a zero type and a special character type, connections between said type segments and said actuators enabling said type segments to move a limited amount relative to said actuators during a machine operation to enable the type segments in orders in which the actuator racks are not moved during a machine operation to move to positions of zero, means for causing said printing mechanism to operate in orders to the left of the last order to the left in which an actuator is moved, a register, and latching mechanism under the control of said register for latching the type segments in the orders in which no actuators are moved against movement relative to said actuators, said latching mechanism including portions acting to disable each of the latches in orders to the right of the last order to the left in which an actuator is moved.

23. A calculating machine having a plural order differential mechanism, a printing mechanism having plural order type carrying members controlled by said differential mechanism and supporting types including a zero type and a special character type, said type carrying members being normally positioned to print zeros during a printing operation in the orders in which the differential mechanism is not moved, means causing the printing mechanism to operate in the orders to the left of the last order to the left in which the differential mechanism is moved, a traveling paper carriage, and means under the control of said traveling paper carriage for positioning said type carrying members in said orders to the left to print special characters instead of zeros.

24. A calculating machine having a plural order differential mechanism, a printing mechanism having plural order type carrying members controlled by said differential mechanism and supporting type including a zero type and a special character type, said type carrying members being normally positioned to print zeros during a printing operation in the orders in which the differential mechanism is not moved, means causing said printing mechanism to operate in orders to the left of the last order to the left in which the differential mechanism is moved, a traveling paper carriage, a register, and means under the joint control of said paper carriage and register for positioning said type carrying members in said orders to the left to print special characters in said orders instead of zeros.

25. A calculating machine having a plurality of banks of depressible amount keys, a plurality of actuators, a printing mechanism including a plurality of type carrying members supporting types including a zero and a special character type, means causing said printing mechanism to operate in orders to the left of the last order to the left in which an actuator is moved during a machine operation, said type carrying members being normally positioned to print special characters in the orders in which no actuators are moved during a machine operation, and means conditioned by depression of said amount keys causing the type carrying members in all orders in which actuator racks are not moved, which orders are to the right of the last order to the left in which an actuator is moved during a machine operation, to be positioned to print zeros instead of special characters.

26. A calculating machine having a plurality of banks of depressible amount keys, a plurality of actuator racks, a printing mechanism including a plurality of type segments carrying digit types and a special character type, connections between said type segments and actuators enabling said type segments to move a limited amount relative to said actuators during a machine operation to enable the type segments in orders in which no actuators are moved to move to position to print zeros, latches normally preventing said movement, means causing said printing mechanism to operate in orders to the left of the last order to the left in which a key is depressed, and means controlled by said amount keys for releasing the latches in the banks in which a key is depressed including portions acting to release the latches in all orders to the right of the last order to the left in which a key is depressed.

ROBERT L. MULLER.